July 11, 1967          G. WADE          3,330,956

OPTICAL BEAM MODULATOR USING ACOUSTICAL ENERGY

Filed June 17, 1963          3 Sheets-Sheet 1

INVENTOR.
GLEN WADE
BY Donald Brown
AGENT

July 11, 1967   G. WADE   3,330,956
OPTICAL BEAM MODULATOR USING ACOUSTICAL ENERGY
Filed June 17, 1963   3 Sheets-Sheet 2

INVENTOR.
GLEN WADE
BY Donald Brown
AGENT

July 11, 1967  G. WADE  3,330,956
OPTICAL BEAM MODULATOR USING ACOUSTICAL ENERGY
Filed June 17, 1963  3 Sheets-Sheet 3

INVENTOR.
GLEN WADE
BY Donald Brown
AGENT

United States Patent Office 3,330,956
Patented July 11, 1967

3,330,956
OPTICAL BEAM MODULATOR USING
ACOUSTICAL ENERGY
Glen Wade, Wayland, Mass., assignor to Raytheon Company, Lexington, Mass., a corporation of Delaware
Filed June 17, 1963, Ser. No. 288,414
4 Claims. (Cl. 250—199)

This invention relates to beam modulating and filtering techniques and more particularly to methods and devices for modulating and filtering high frequency electromagnetic radiation, such as that produced by lasers.

One of the problems incident to high frequency electromagnetic radiation, such as that produced by laser devices, is the difficulty in modulating or filtering the energy emitted from these sources. Various methods of modulating and filtering have been devised and in the case of lasers concern themselves with either internal modulation of the beam prior to its being emitted or externally modulating the energy emitted from the laser source.

Most of the physical effects that have been used to externally modulate a light beam can be classified as mechanical, electrical or magnetic. One of the more primitive amplitude modulation techniques presently available is that provided by mechanically chopping the beam by way of a rotating sector disc, but this has not found wide utility outside of the laboratory. Other modulation techniques utilize electro and magnetostrictive effects involving the contraction of certain solids when subjected to fields. Of these the piezoelectric effect is the most useful. An optically flat mirror on the face of the piezoelectric crystal may be vibrated by an alternating current electric field applied to the crystal. This will frequency modulate a light beam from the face of the crystal. Other possible techniques include the use of electrical polarization effects to modulate a light beam. In the Kerr effect a plain polarized light beam passing through a crystal is split into two beams, polarized in planes at right angles to each other. The affect is proportional to an applied electric field and can be used effectively to chop a light beam at frequencies up to 10,000 mc. Another method for modulating lasers involves the use of Pockel's effect in solids, but the disadvantage of this approach is the requirement of high electric fields necessary to modulate the beam.

Although the above-mentioned prior art suggests various means for modulating high frequency electromagnetic radiations, disadvantages as noted above have been encountered.

Accordingly, it is an object of this invention to provide a new, useful and improved technique for modulating electromagnetic radiation.

It is another object of this invention to provide a new and improved technique for filtering electromagnetic radiation.

It is an additional object of this invention to provide an improved technique for modulating high frequency electromagnetic radiation by inducing acoustical vibrations in a material to attenuate radiation passing through the material.

In accordance with the modulation and filtering techniques of this invention an electromagnetic radiation beam is affected by acoustical vibrations. In one embodiment of this invention a light beam is amplitude modulated while passing through a transparent crystalline structure by producing stop-bands in said structure by means of traveling acoustic waves. In another embodiment of the invention standing acoustic waves are used for the same purpose. In a further embodiment, filtering of a light beam is accomplished with the traveling or standing acoustic waves. By altering the frequency of the acoustic waves the filtering can be tuned, since the frequency of the band being filtered is changed. In an additional embodiment, frequency or phase modulation of a light beam is provided by acoustic vibrations which periodically change the density of the solid material in the path of a light beam and hence the electrical length of the path. In a further embodiment, an electron beam is modulated as it passes through a crystalline structure by inducing periodic loading in the path of the electron beam.

Other objects and features of this invention will become apparent from the following description taken in connection with the following drawings; wherein.

Figure 1:
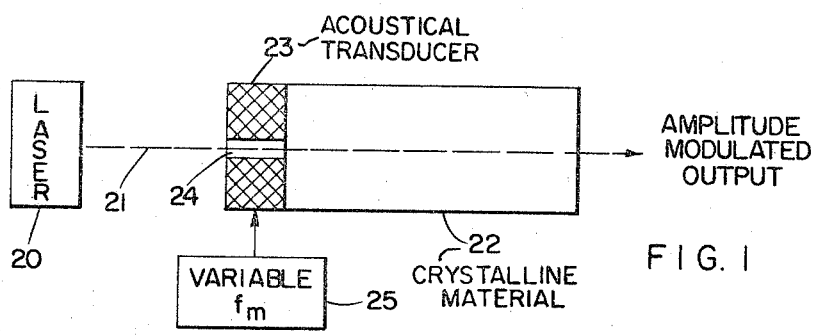
FIG. 1 is a side view partly in axial section of a device for modulating a light beam with a traveling wave according to the invention.

Referring now to FIG. 1 which shows a device for modulating a light beam with a traveling acoustic wave according to the invention. A laser 20 is shown for providing a beam of electromagnetic radiation 21, such as coherent light. The beam of radiation 21 is shown passing through an aperture 24 in an actuating rod section of a piezoelectric acoustic transducer 23 to enter a crystalline material 22, which is a quartz material. There is shown a source of energy 25 for feeding electromagnetic energy to transducer 23 to excite acoustical waves in the crystalline material 22, thereby periodically altering the density of the material and hence providing a spatially periodic modulation of the dielectric constant of the material 22. Thus, the light beam 21 passing through the material 22 will be affected by the spatially periodic variation of dielectric constant which produces periodic capacitive loading similar to that produced in a capacitively loaded line. The temporal periodicity in the dielectric constant also produced is not important to the operation of the device.

Figure 10:
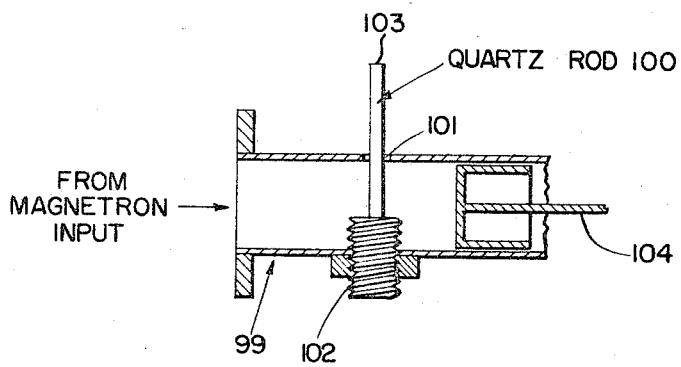
FIG. 10 is a diagram illustrating a cross section of a waveguide cavity transducer device for generating acoustical waves.

A tunable cavity resonant magnetron device is used in this particular embodiment as the source of energy 25, although other devices providing electromagnetic energy in the required frequency bands could be substituted. The particular transducer device 23 of the preferred embodiment is shown in FIG. 10. It comprises a waveguide cavity section 99 excited from a source of energy, such as a magnetron. Mounted therein by means of a machine screw 102 is a portion of an actuating rod comprised of a quartz material which extends through an opening 101 in the waveguide 99. An electric field is established within the waveguide 99 in the vicinity of the rod 101. This electric field excites acoustic vibrations in the quartz rod which in turn, by way of mechanical coupling of the rod end 103 to the material 22 of FIG. 1, induces acoustic waves in the crystalline material 22. A shorting plunger 104 is shown for adjusting the electric field in the vicinity of the rod to obtain maximum output vibration of the rod.

More particularly, the device for modulating the amplitude of a laser beam consists of a piece of crystalline material 22 in a cylindrical shape, said material being normally transparent to electromagnetic radiation provided by the laser beam 21. The opacity of the material is modulated by means of an acoustical wave which is set up in the material 22 by the transducer 23. The presence of an acoustical wave in the crystalline material 22 creates periodic variations of the density of the material and hence provides a periodic modulation of the dielectric constant of the material 22. At any instant of time the dielectric constant varies periodically with the longitudinal distance along the axial length of the crystalline material. A laser beam, such 21, penetrating into the material will experience the periodic variation in density as the beam travels along the axial direction of the cylindrical shaped material 22. This periodic variation is caused by the acoustic traveling wave set up by the acoustical transducer 23 providing acoustical energy along the axial direction of the crystalline material 22. Since the velocity of the light beam through the transparent material 22 is much greater than the velocity of the acoustic wave through the solid crystalline material 22, for all practical purposes the acoustic wave appears to be stationary to the light beam wave. If the wavelength of the acoustic wave is adjusted such that it is one-half that of the wavelength of the laser beam, then the periodically varying dielectric constant establishes a stop band for electromagnetic transmission at the frequencies of the laser beam. For an explanation of stop bands as applied to periodic and guiding structures, see the article "Periodic and Guiding Structures at Microwave Frequencies" by A. F. Harvey, published in the I.R.E. Transactions on Microwave Theory and Techniques in January 1960. Additionally, a description of the frequency characteristics of waveguides with periodic structures describing stop bands as applied to such structures is disclosed in the article "Some Properties of Waveguides With Periodic Structure" by A. W. Lines, G. R. Nicoll and A. M. Woodward in the magazine, The Proceedings of the I.R.E., published in July 1950.

Figure 2:
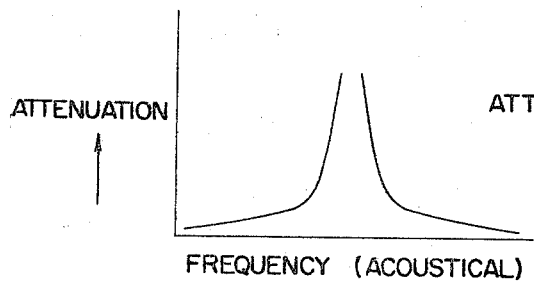
FIG. 2 is a diagram illustrating the attenuation stop band produced by the acoustical frequency modulation of this invention.

Thus in the situation shown in FIG. 1, if the frequency of the magnetron $f_m$ is varied, such as by cavity tuning, it is possible as shown in FIG. 2 to alter the position of the attenuation versus acoustic frequency of vibration characteristic of the material 22 and thus amplitude modulate the laser beam 21.

The physical description for the occurrence of the stop band described above is as follows: Each variation in the dielectric constant caused by the acoustical traveling wave passing through the crystalline material causes a small reflection of the electromagnetic wave 21 passing therethrough. Since the variations have been adjusted to be half a wavelength, the reflections of the electromagnetic wave 21 thus produced add in phase, and hence reinforce each other, thus providing a complete reflection of the incident wave for infinitely long paths within the material. The above physical description is borne out by mathematical analysis. The wave equation for the propagation of an electromagnetic material whose dielectric constant varies sinusoidally with distance is a well known Mathieu equation given in the book, Van Nostrand's Scientific Encyclopedia, 3rd Edition, published in 1958. Stop bands and pass bands for electromagnetic radiation passing through the aforementioned material can be shown by this Mathieu equation. In this particular embodiment, calculations show that, for quartz, an acoustical frequency of vibration of approximately 36 kmc. is needed to provide stop bands for a laser beam of a frequency of $10^{14}$ cycles per second. An analysis shows that the reflection coefficient $\rho$ is given approximately as follows:

$$\rho = n\frac{\pi}{2}\Delta$$

wherein $n$ is the number of acoustical wavelengths and $\Delta$ is the fractional variation in the dielectric constant. A reasonable value of $\Delta$ in quartz is approximately $10^{+6}$ and hence for approximately complete reflectivity $n$ would approach $10^6$. This represents a crystal length of approximately 6 inches. From the above, it is seen that a beam of electromagnetic radiation such as that produced by a laser source can be amplitude modulated by the setting up of an acoustical traveling wave in a crystalline material structure to produce stop and pass bands within the crystalline material. In this manner, by varying the frequency of the acoustical signal established within the crystalline material, the attenuation characteristic shown in FIG. 2 can be varied in position, thus providing a means for amplitude modulating the electromagnetic radiation.

Figure 4:
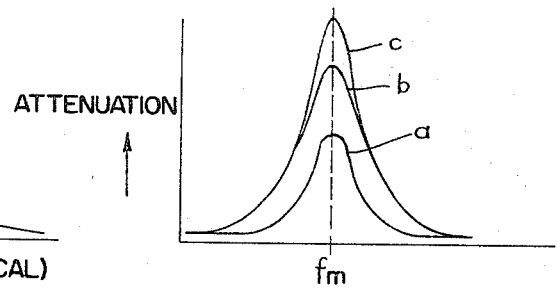
FIG. 4 is a diagram illustrating the various attenuations provided at a particular acoustical frequency in accordance with the amplitude of the acoustical signal.
Figure 3:
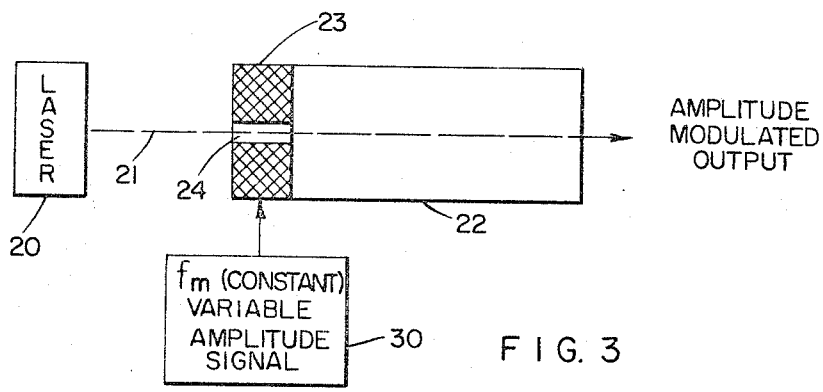
FIG. 3 is a side view partly in axial section of a device for amplitude modulating a light beam in accordance with the amplitude of an acoustical signal.

With the particular reference to FIGS. 3 and 4, another embodiment of a device for amplitude modulating electromagnetic radiation such as that produced by a laser 20 is shown. The electromagnetic radiation beam 21 produced by laser 20 is of substantially coherent radiation. There is also shown a crystalline material 22, such as quartz, having mounted at one end along its transverse direction a piezoelectric transducer 23. Transducer 23 induces acoustical traveling waves in the material 22. The material 22 is also transparent at the frequency of the light beam emitted from the laser 20. A source of energy 30 is shown for providing energy at a frequency $f_m$ to actuate transducer 23, thereby inducing acoustical traveling waves within the material 22. In this particular situation, the amplitude of the energy produced by the source 30 is varied by feeding a portion of the total energy provided by source 30 to a dummy load, not shown. Thus, by varying the amount of energy fed to the dummy load, a beam 21 passing through the aperture 24 and through the crystalline material 22 is amplitude modulated. The frequency of the energy source 30 is adjusted by cavity tuning such that there exists a stop band at the particular frequency transmitted by the laser source 20. By adjusting the amplitude of the energy source freqency, the curves $a$, $b$ and $c$ of FIG. 4, are produced by the acoustical vibrations, and thus a variable attenuation of the material 22 is provided to amplitude modulate the laser beam 21.

Figure 5:
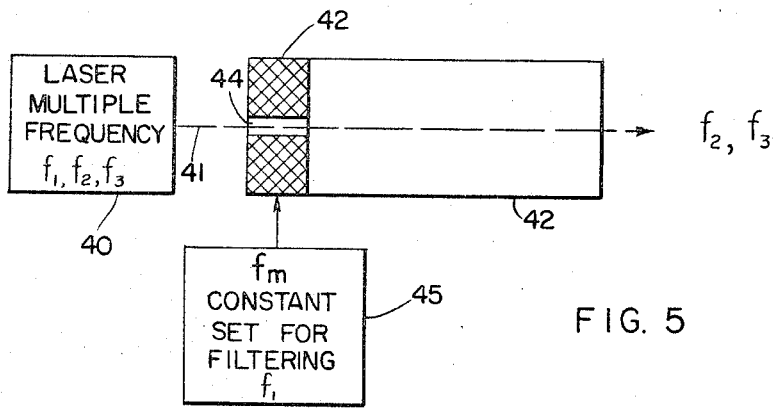
FIG. 5 is a side view partly in axial section of a device for filtering one of a plurality of light frequencies.

FIG. 5 shows a device to be used in situations requiring filtering of particular light frequencies. In this embodiment, a laser source 40, which could be of the substantially non-coherent type, emits a beam of light including a plurality of frequencies, such as $f_1$, $f_2$ or $f_3$. By setting up stop bands within a crystalline material 42, any one of the particular frequencies, $f_1$, $f_2$ or $f_3$ can be separated from the beam 41. In this particular embodiment, a magnetron source 45 is adjusted to provide energy to a piezoelectric type transducer to set up a stop band at a frequency $f_1$ within the crystalline material 42. This then provides attenuation to the frequency $f_1$, while at the same time permitting the other frequencies $f_2$ and $f_3$ to pass through the crystalline material 42 unimpeded. In this manner it is possible to filter particular frequencies of electromagnetic radiation, particularly that in the light frequency range, by inducing acoustic traveling waves within a crystalline material.

Figure 6:
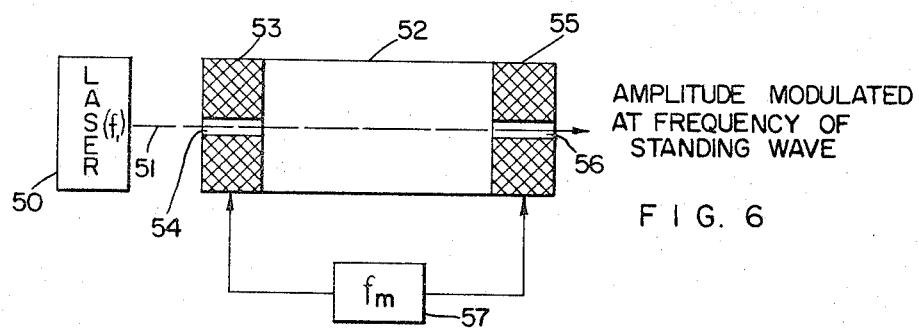
FIG. 6 is a side view of a device for amplitude modulating a light beam at the frequency of a standing wave.

Now referring to FIG. 6, there is shown a device for amplitude modulating electromagnetic radiation, particularly that within the light frequency ranges, by inducing acoustical standing waves within a crystalline material. In this embodiment, a laser 50 is shown for generating laser beam 51. The laser beam 51 is shown passing through aperture 54 in a first piezoelectric transducer 53 which is mounted on one end of a cylindrically shaped crystalline material 52. At the other end of the crystalline material 52 the light beam passes through aperture 56 in a piezoelectric transducer 55 which is mounted on the other end of the crystalline material 52. By simultaneously applying energy at a signal frequency $f_m$ to the two transducers 53 and 55 a standing wave pattern of acoustical vibration is induced in material 52. This vibration modulates the light beam 51 at twice the frequency of the induced acoustical vibration frequency provided by either transducer, since the density variations in the material will come and go at twice the acoustical vibration frequency. It is also possible to alter the amplitude of the signal $f_m$ to amplitude modulate the light beam 51 similarly, as described with relation to FIGS. 3 and 4 above.

Figure 7:
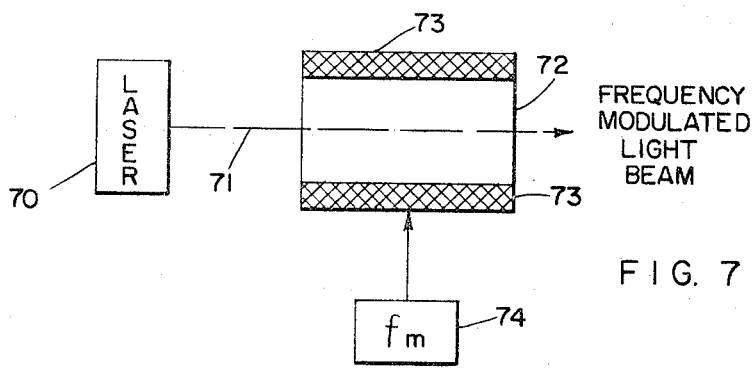
FIG. 7 is a side view of a device for frequency modulating a light beam.

Referring now to FIG. 7, there is shown a device for frequency modulating a light beam by providing acoustical vibrations substantially orthogonal to the path of said beam and across or transverse to the longitudinal or lengthwise dimension of a crystalline structure, thereby providing density variations to electromagnetic radiation beams passing through the material in the longitudinal dimension of the material.

In particular, a laser source 70 is shown for providing a light beam 71 which passes through a crystalline transparent material, such as quartz. A transducer 73 is shown in section and is jacketed around the crystalline material 72 to induce acoustical vibrations within the crystalline material 72. A generator 74 is shown to provide the energy at a frequency $f_m$ to actuate the acoustical transducer 73, which could be of a piezoelectric type. By providing this energy, the material can be squeezed such that the light beam passing through the center portion of the crystalline material can be frequency modulated in accordance with a density shift along the axial dimension of the crystalline material. In this manner frequency or phase modulation of a light beam can be obtained in accordance with acoustical vibrations set up in a crystalline material.

Figure 8:
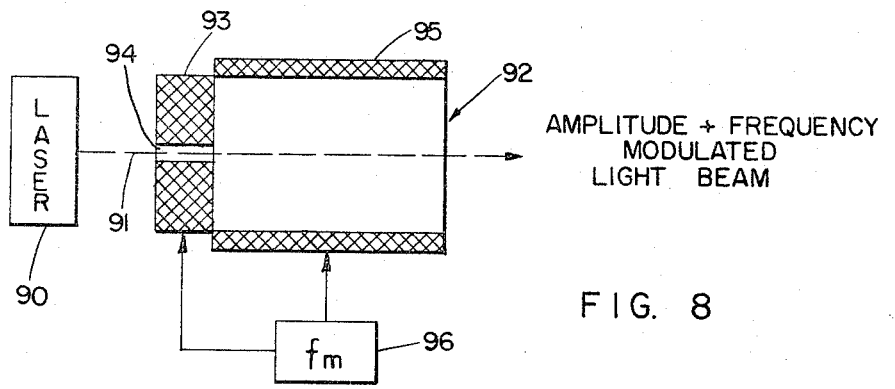
FIG. 8 is a side view of a device for imparting both amplitude and frequency modulation to a light beam according to the invention.

In a further embodiment, particularly useful in imparting both amplitude and frequency modulation to electromagnetic radiation, there is disclosed in FIG. 8 a laser source 90 for providing a light beam 91. The light beam 91 is shown passing through an aperture 94 in a transducer 93 and thence through the crystalline material 92. Another transducer 95 is shown jacketing the crystalline material and mounted orthogonal to the other transducer 93. The transducer 93 is positioned to induce acoustical vibrations or acoustical traveling waves along the longitudinal dimension of the crystalline structure 92. The transducer 95 is positioned in this particular instance to generate pulsating density shifts within the crystalline material along the transverse or widthwise dimension of the crystalline material 92. An energy generator 96 is shown for providing energy to actuate both transducers 93 and 95. In this manner, both amplitude and frequency modulation of a light beam can simultaneously be obtained utilizing the techniques of this invention.

Figure 9:
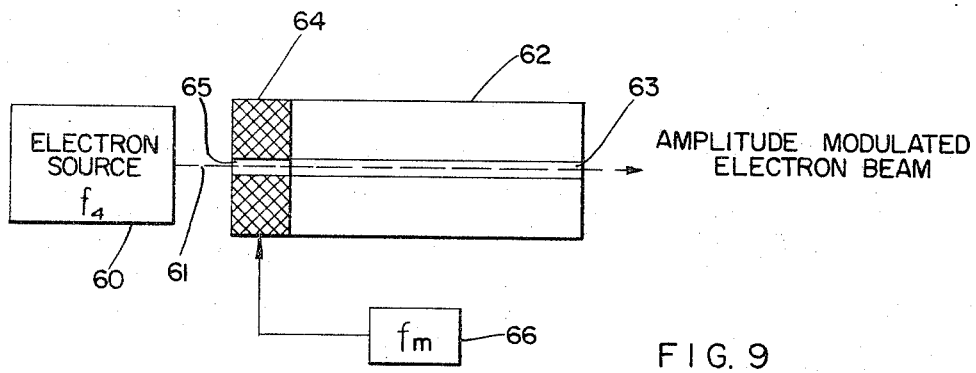
FIG. 9 is a side view of a device for amplitude modulating an electron beam.

With reference now to FIG. 9, a device for amplitude modulating an electron beam or for interacting with a previously amplitude modulated electron beam by providing acoustical vibrations within a crystalline material is shown. For purposes of explanation, assume the beam 61 provided by electron source 60 is previously amplitude modulated at a frequency $f_4$. This electron beam could be modulated at a submillimeter wave frequency or other frequencies, but for the purposes of this embodiment it is assumed that the electron beam is at submillimeter wave frequency, the modulation being produced by the devices disclosed in the article "A Survey of Research on Submillimeter Wave Generators and Amplifiers," written by Glen Wade in the magazine Electronic Progress, published in March of 1962 by the Raytheon Company and copyrighted in 1962.

The beams of electrons 61 is shown passing through an aperture 65 in piezoelectric transducer 64 and then passing through a channel 63 along the longitudinal direction of a cylindrically shaped crystalline material 62. An energy generator 66 is shown for providing energy to actuate the transducer 64 to set up acoustical traveling waves within the crystalline structure 62. This acoustical wave set up in the crystalline material creates a periodic variation in the dielectric constant along the length of the material. This periodicity constitutes periodic loading for any electromagnetic transmission. Thus, traveling wave interaction of the electron beam can be obtained and therefore a periodic structure particularly suitable for use in the submillimeter region can be provided to interact with an electron beam.

It would be possible to modulate an unmodulated entering beam by means of electron beam interaction with a backward wave mode in the material to obtain backward wave oscillations. The beam would then leave the region with amplitude modulation.

It would also be possible to utilize standing waves as disclosed with regard to FIG. 6, to modulate the electron beam or to amplify modulation already on it, and furthermore, it would be possible, as disclosed in FIGS. 3 and 4, to amplitude modulate the modulated beam in accordance with the amplitude of the energy applied to the transducer. Modulation and filtering devices, such as disclosed above, could be constructed of other types of crystalline materials such as glass, silicon dioxide and aluminum dioxide. Additionally, other types of transducers of the type could be substituted in lieu of the piezoelectric transducer. Furthermore, configurations other than a cylindrically shaped crystalline material could be utilized for the above purposes. Accordingly, it is desired that this invention not be limited except as defined by the appended claims.

What is claimed is:

1. A device for modulating a narrow beam of substantially coherent electromagnetic radiation propagated along a path therethrough comprising a crystalline material, and means for producing acoustical waves in said material along a path parallel to said path of electromagnetic radiation and having wave fronts substantially perpendicular to the propagation path of said electromagnetic radiation through said material, said acoustical waves providing a stop band for said electromagnetic radiation when the wavelength of said acoustical wave is equal to substantially one-half of the wavelength of said electromagnetic radiation.

2. A device for amplitude modulating a narrow beam of substantially coherent electromagnetic radiation propagated along a path therethrough comprising a crystalline material, said crystalline material having a transduced mounted on one end thereof, and means for providing a signal to said transducer to produce acoustical waves along a path parallel to said path of electromagnetic radiation and having wave fronts perpendicular to said paths a variation in the dielectric constant of said said paths for producing a variation in the dielectric constant of said crystalline material, said variation in dielectric constant producing amplitude modulation of said electromagnetic radiation passing through said crystalline material.

3. A device for amplitude modulating a beam of coherent electromagnetic energy propagating along a path therethrough comprising a crystalline material, and means for producing in said material a standing wave propagating substantially parallel to the propagation path of said beam, said wave comprising a plurality of acoustical waves each of a given frequency and having wave fronts perpendicular to the propagation path of the beam, said beam being modulated at a frequency which is substantially twice the frequency of one of said acoustical waves.

4. A device for amplitude modulating a beam of coherent electromagnetic radiation comprising an elongated crystal which produces stop bands when acoustically activated, an apertured piezoelectric transducer mounted on one end of the crystal, a laser for generating said beam of coherent radiation and directing said beam through the aperture in the transducer into the crystal, and microwave generating means connected to said transducer for producing microwaves and transmitting said microwaves to the transducer, said transducer being responsive to the microwaves to transmit acoustic waves into the crystal parallel to the path of said beam of radiation, and said crystal being responsive to said acoustic waves to produce stop bands therein for modulating said beam of radiation.

References Cited

UNITED STATES PATENTS

| | | | |
|---|---|---|---|
| 2,449,166 | 9/1948 | Hershberger. | |
| 2,451,465 | 10/1948 | Barney. | |
| 2,600,962 | 6/1952 | Billings | 88—61 X |
| 2,711,514 | 6/1955 | Rines | 332—54 X |
| 3,121,169 | 2/1964 | Benton | 250—199 |
| 3,164,665 | 1/1965 | Stello | 88—61 |
| 3,174,044 | 3/1965 | Tien | 250—199 |
| 3,239,670 | 3/1966 | Boembergen | 250—199 |

FOREIGN PATENTS 608,711  3/1962  Belgium.

OTHER REFERENCES

Bloembergen et al.: Phys. Review, Dec. 15, 1960, pp. 2014–2023 (page 2023 relied on).

Vogel et al.: Electronics, Nov. 10, 1961, pp. 81–85 (p. 84 relied on) TK 7800. E58.

Barnes: Proc. I.R.E., July 1962, p. 1686.

Bloembergen et al.: Journ. Appl. Physics, vol. 33, No. 12, December 1962, pp. 3440–3443.

JOHN W. CALDWELL, *Acting Primary Examiner.*